Sept. 15, 1959  W. H. SPIRI  2,904,311
KELLY BUSHING CENTERING MEANS
Filed Aug. 21, 1957  2 Sheets-Sheet 2
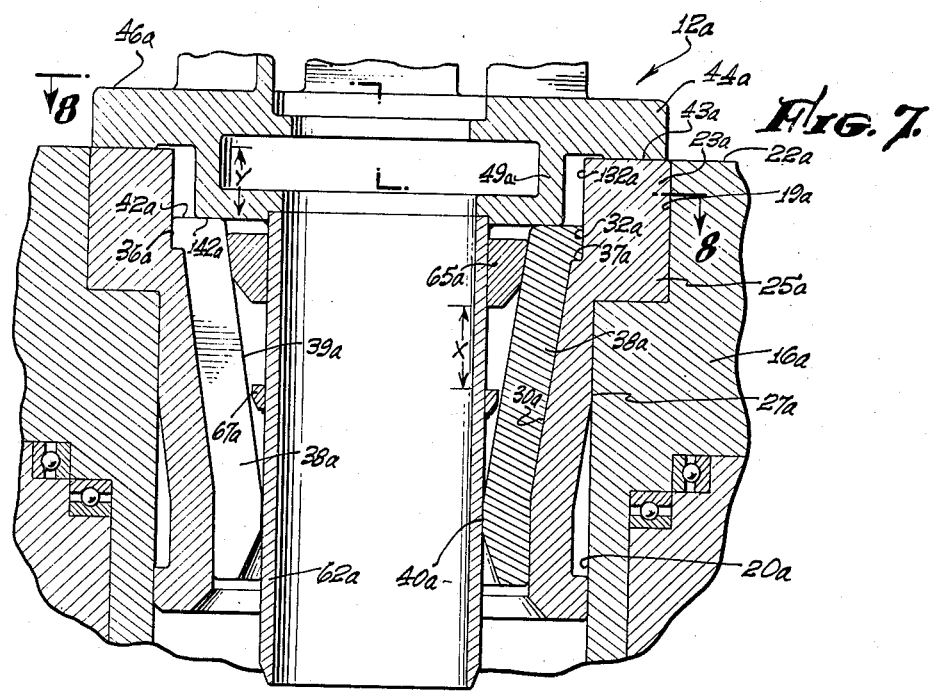
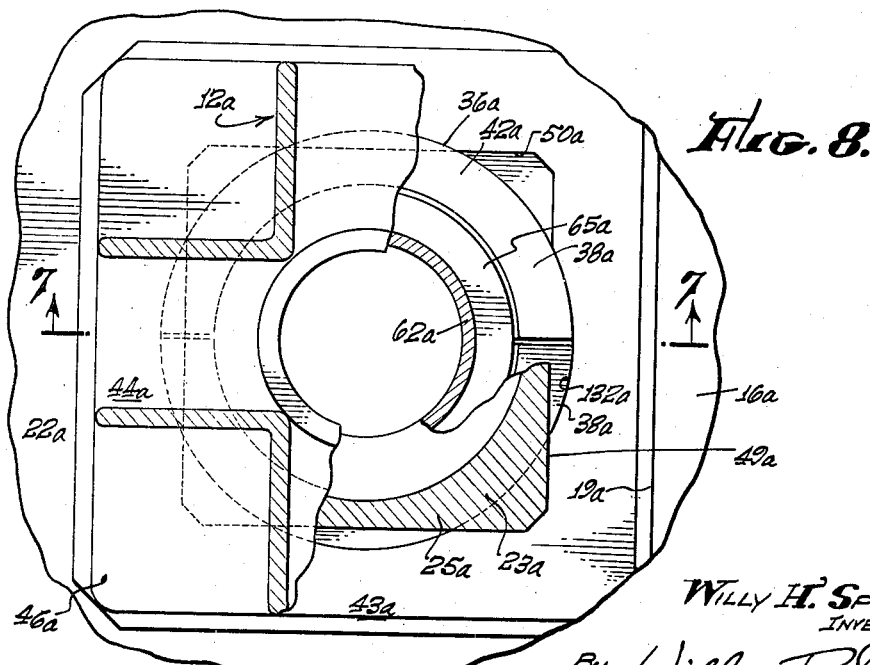
WILLY H. SPIRI,
INVENTOR.
By William P. Green
ATTORNEY.

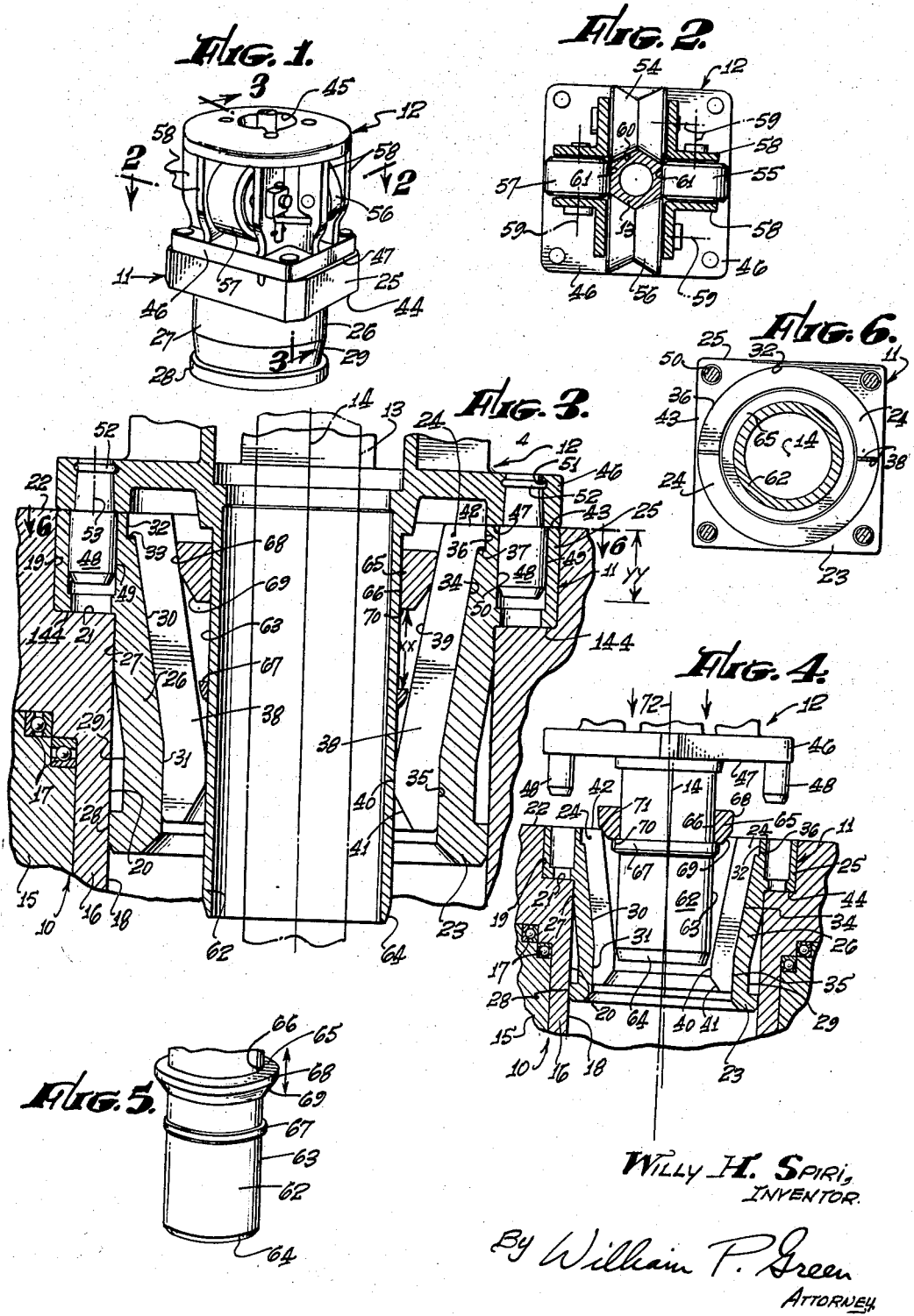

United States Patent Office 2,904,311
Patented Sept. 15, 1959

2,904,311

KELLY BUSHING CENTERING MEANS

Willy H. Spiri, Whittier, Calif., assignor to Abegg & Reinhold Co., Vernon, Calif., a corporation of California Application August 21, 1957, Serial No. 679,405

19 Claims. (Cl. 255—23)

This invention relates to improved kelly bushing structures for use in drilling wells, and the invention is particularly concerned with means for easily and effectively centering a kelly bushing relative to an associated master bushing structure as the kelly bushing is moved into its active position of use.

During the drilling of a well, it rather frequently becomes desirable to move a kelly bushing into and out of its position of support by the master bushing structure and rotary table. In moving the kelly bushing to that position, it is first moved to a position above the master bushing, and is then lowered until it rests on or in the master bushing to be supported thereby. As the kelly bushing is thus moved downwardly it moves into interfitting engagement with the rotary driving means of the master bushing or rotary table, so that the kelly bushing will subsequently turn with the rotary table.

One difficulty which has heretofore been encountered in such positioning of a kelly bushing is the problem of properly aligning the kelly bushing with the master bushing in a manner assuring easy interfitting of the rotary drive parts. This problem of alignment is especially difficult when the drive connection consists of a pin type drive, including pins carried by and projecting downwardly from the kelly bushing and receivable within openings in or associated with the master bushing.

The general object of the present invention is to provide improved means for automatically effecting the discussed alignment of the kelly bushing as it is moved downwardly toward its active position. For this purpose, I provide the kelly bushing with a projection which extends downwardly within the master bushing to be centered by a lower portion thereof, together with a second element, preferably a ring to engage and be centered by the master bushing at an upper location. A particular feature of the invention resides in the mounting of the second or upper element for limited vertical shifting movement relative to the kelly bushing, and particularly relative to the drive pins or other drive elements, during lowering of the kelly bushing, so that the upper element will enter and be centered by the master bushing structure before the drive pins or elements are low enough to interengage with their coacting parts. This centers the entire kelly bushing, so that upon further downward movement the drive parts will precisely interfit. After the upper centering element is itself accurately centered, and supported, its downward movement ceases, and the relative movability of the rest of the kelly bushing then allows the latter to continue its downward movement to a fully seated position.

The shiftable centering ring or element should preferably have a downwardly tapering surface for camming it toward a centered position during lowering. Desirably this surface has one portion which tapers in correspondence with an associated seat in the master bushing on which the element ultimately is supported, and this surface also has a second portion of greater angularity for effecting an initial camming action.

The above and other features and objects of the present invention will be better understood from the following detailed description of the typical embodiment illustrated in the accompanying drawing in which:

Fig. 1 is a perspective view of a kelly bushing constructed in accordance with the invention, and shown positioned in an associated master bushing structure;

Figs. 2 and 3 are horizontal and vertical sections, respectively, taken on lines 2—2 and 3—3 of Fig. 1;

Fig. 4 is a view similar to Fig. 3, but showing the kelly bushing as it is being inserted downwardly into the master bushing;

Fig. 5 is a fragmentary perspective view of the lower portion of the kelly bushing assembly;

Fig. 6 is a reduced section taken on line 6—6 of Fig. 3;

Fig. 7 is a view similar to Fig. 3, but showing a variational form of the invention taken on line 7—7 of Fig. 8; and Fig. 8 is a section on line 8—8 of Fig. 7.

Referring first to Figs. 1 to 6, I have represented fragmentarily at 10 a conventional well drilling rotary table structure, within which there is mounted a master bushing assembly 11. This master bushing assembly 11 in turn supports and partially contains a kelly bushing 12, which is constructed to coact with the master bushing assembly 11 in the unique manner taught by the present invention. The purpose of the kelly bushing is of course to rotatively drive and engage kelly 13, about vertical axis 14, while permitting relative vertical movement of the kelly to advance the connected drill string downwardly within a well. The kelly may be of any conventional non-circular external cross sectional configuration, and is typically represented as being of hexagonal configuration (see Fig. 2).

The rotary table assembly 10 includes the usual outer generally annular stationary section 15, which mounts inner annular section 16 for rotation about the vertical axis 14 of the table. To mount section 16 for such rotation, there may be provided between the parts any suitable annular bearing structures, such as the ball bearings represented typically at 17. The inner section 16 is driven about axis 14 by a suitable engine or motor, and contains a central vertically extending opening 18 within which the master bushing assembly 11 is removably mounted. Opening 18 in the rotary table section 16 has an upper portion 19 of non-circular, preferably square, horizontal section. Beneath this upper square portion 19 of opening 18, this opening has a lower cylindrical portion 20 centered about axis 14 and of a diameter less than the horizontal dimension of square portion 19 of opening 18. Between these two portions 19 and 20 of opening 18, the rotary table section 16 forms an upwardly facing horizontal shoulder 21, which functions to support the master bushing assembly 11 within the rotary table. As will be apparent, the square portion 19 of opening 18 is of course centered about axis 14. Above the level of upper portion 19 of opening 18, the rotating section 16 of the rotary table may have an upper upwardly facing horizontal top surface 22.

The master bushing assembly 11 includes an outer rigid essentially tubular one piece body 23, removably containing a pair of complementary semi-circular inner slip bowl segments 24. The outer body 23 has an upper portion 25 which is externally of essentially the same non-circular (preferably square) horizontal section as is the square recess 19 in the rotary table, to fit closely within recess 19 and be effectively rotatively driven about axis 14 with the rotary table, by reason of the interfitting of upper portion 24 of the master bushing within the square portion of the rotary table opening. Beneath its upper square portion 25, the outer master bushing body 23 has a lower portion 26, which is circular in horizontal section, and is adapted to fit in the cylindrical portion 20 of the rotary table opening 18. This lower portion 26 of the master bushing body has external cylindrical surfaces at 27 and 28 which are of approximately the same diameter as surface 20, to be effectively centered by and within the rotary table. Between these surfaces 27 and 28, the lower portion 26 of the bushing body 23 may be annularly recessed at 29.

Internally, body 23 has a downwardly tapering surface 30 of frustro-conical configuration, which terminates downwardly in a straight cylindrical surface 31, and terminates upwardly in another straight cylindrical surface 32, with a support shoulder 33 typically being provided between surfaces 30 and 32. The two slip bowl segments 24 may be of identical configuration, each being semi-circular, and both being adapted when placed in body 23 to form together a composite slip bowl structure of annular configuration. More specifically, these slip bowl segments 24 have outer complementary surfaces 34 which peripherally decrease in diameter as they advance downwardly, and which are of frustro-conical configuration corresponding to the engaged surface 30 of body 23. Beneath and above surface 34, the slip bowl segments have complementary external cylindrical surfaces 35 and 36 which correspond in diameter to, and engage, surfaces 31 and 32 of body 23. Also, slip bowl segments 24 may have an annular shoulder 37 which is parallel to surface 33 and part 23, but is normally spaced above surface 33, so that the slip bowl segments may be supported in body 23 by the downwardly converging surface 30. The two semi-circular slip bowl segments 24 engage one another at two diametrically opposite locations, the engaging surfaces 38 at these locations being disposed within a vertical diametrical plane containing axis 14.

Internally, the slip bowl segments 24 have complementary frustro-conical surfaces 39, which progressively decrease in diameter as they extend downwardly, and which may terminate in a short cylindrical surface 40 and then in a flaring surface 41. The upper surfaces 42 of segments 24 may lie in the same horizontal plane as upper surface 22 of the rotary table, and the upper surface 43 of the outer master bushing body 23. The entire master bushing assembly, including parts 23 and 24, is supported in the opening or recess 18 of the rotary table by means of a horizontal shoulder 44 formed at the underside of the upper portion 25 of body 23, and bearing downwardly against support surface 21 of the rotary table.

When it is desired to support a drill pipe in the master bushing assembly, the kelly bushing 12 is removed from the master bushing, and conventional slips are inserted downwardly into the two bowl segments 24, to have their downwardly tapering outer surfaces engage surfaces 39 of the slip bowl segments, so that the pipe may be effectively supported by the slips. When, however, it is desired to rotatively drive a kelly 13, during drilling of a well, the kelly bushing 12 is mounted on master bushing assembly 11, to transmit rotary motion about axis 14 to the kelly. This kelly bushing may include a rigid body 44, having a vertical opening 45 through which the kelly 13 extends, and having a support portion 46 of square horizontal section corresponding substantially to the upper portion 25 of body 23, and adapted to rest on that portion 25 of body 23, to support the kelly bushing on the master bushing assembly. At its underside, portion 46 of body 44 may have a horizontal or transverse undersurface 47, which engages upper surface 43 of the master bushing body. At its four corners, portion 46 of the kelly bushing body carries four parallel vertically extending downwardly projecting pins 48, having externally cylindrical portions 49 removably projecting downwardly into four correspondingly dimensioned cylindrical recesses 50 formed in the corners of upper square portion 24 of master bushing body 23. These pins 49 extend upwardly into openings 51 in portion 44 of the kelly bushing body, and are rigidly retained in that position of attachment to the kelly bushing body by means of upper retaining rings 52. The four pins 49 are evenly circularly spaced about axis 14, and have their individual axes 53 extending parallel to axis 14. Thus, when the kelly bushing is slipped downwardly relative to master bushing body 23, to the position of Fig. 3, pins 49 slip into recesses 50, to thereafter very positively transmit rotation about axis 14 from body 23 to the kelly bushing. Upward movement of the kelly bushing very easily and quickly breaks this drive connection between the kelly bushing and the master bushing assembly, by moving pins 49 out of recesses 50.

For transmitting the rotary motion to kelly 13, the body 44 may carry any suitable means adapted to engage the outer non-circular surface of kelly 13 in driving relation. For best operation I prefer to employ four rollers 54, 55, 56 and 57 for this purpose, with these rollers being rotatively mounted to portions 58 of body 44 for rotation about individual horizontal axes 59. The kelly engaging surfaces of these rollers 54 through 57 are shaped in correspondence with the particular kelly which is to be used, and when the kelly is of hexagonal horizontal section as shown in the drawing, these rollers may have surface configurations illustrated in Fig. 2. More specifically, the two rollers 54 and 56 may have V-shaped notches 60 formed in their peripheries, and adapted to engage two opposed corner portions of the kelly 13, while the other two rollers 55 and 57 may have externally cylindrical surfaces 61 for engaging the kelly surfaces which are between those engaged by rollers 54 and 56. The surfaces of the rollers which engage the kelly move essentially vertically, to thus mount the kelly for very free vertical movement relative to the kelly bushing 12.

The present invention is particularly concerned with the manner of properly centering the kelly bushing as it is lowered into the master bushing assembly 11, in order to assure proper reception of pins 49 in openings 50. For this purpose, the kelly bushing body 44 has a portion 62 which projects downwardly from the previously mentioned square portion 46 of the kelly bushing body, and which is desirably of tubular, externally and internally cylindrical, configuration. The cylindrical outer surface 63 of projection 62 is of a diameter corresponding substantially to the internal diameter of surface 40 near the lower end of the slip bowl structure formed by segments 24. Also, the tubular portion 62 is centered about axis 14, and is long enough to project downwardly past surface 40, to be received within that surface and thus center the lower portion of projection 62 as the kelly bushing is moved downwardly to its Fig. 3 position of engagement with the master bushing assembly. The lower extremity of projection 62 may be tapered downwardly at 64, at an angle corresponding approximately to the angle of surface 39 relative to axis 14. As seen best in Fig. 4, the length of projection 62 is such as to assure the entry of the lower end of that projection within the cylindrical portion 40 of slip bowl segments 24 considerably before pins 49 reach the location of recesses 50 upon a downward movement of kelly bushing 12 toward its Fig. 3 position of support by the master bushing assembly. Thus, projection 62 assures very effective centering of the kelly bushing at one location, specifically at the location of surface 40.

To provide for proper centering of the kelly bushing at a second location, I provide about the upper portion of projection 62 an annular element or ring 65, having an inner cylindrical surface 66 closely fitting about surface 63, but sufficiently loose to allow vertical sliding movement of ring 65 relative to projection 62. When the kelly bushing is not in its position of support on master bushing assembly 11, ring 65 rests downwardly against a ring 67 which is rigidly carried by and about projection 62 at a location spaced beneath portion 46 of the kelly bushing body 44. When, however, the kelly bushing is in its Fig. 3 position, ring 65 is in engagement with downwardly converging surface 39 of the slip bowl segments 24, and is supported by that engagement in a position spaced above ring 67. For engaging surface 39, ring 65 has a downwardly tapering surface 68, centered about axis 14, and preferably having the same frustro-conical angularity or tapering configuration as the engaged surface 39. Beneath this surface 68, ring 65 desirably has another frustro-conical downwardly tapering surface 69, which tapers downwardly considerably more rapidly than surface 68, that is, at a greater angle to axis 14 than surface 68. Beneath surface 69, the ring may have a short annular surface 70 extending transversely of axis 14.

Again referring to Fig. 4, it is noted that ring 65, when supported by ring 67, is so positioned as to move downwardly into the upper end of the frustro-conical surface 39 formed by segments 24, considerably before pins 49 move into recesses 50 upon a downward movement of the kelly bushing. Preferably, ring 65 first moves into the recess formed by surface 39 at about the time that the lower end of projection 62 moves into engagement with cylindrical surface 40 at the lower end of segments 24. Upon subsequent downward movement of the kelly bushing, the surface 69 on ring 65 engages segments 24 at 71, and by virtue of this engagement tends to cam ring 65 toward a properly centered position relative to axis 14 as the ring 65 moves downwardly. During downward movement of the kelly bushing, the operator may move the kelly bushing to various different positions relative to axis 14, to progressively allow downward movement of ring 65 into the slip bowl segments 24, and to progressively cam the ring 65 toward a properly centered position as a result of that downward movement. After ring 65 has moved downwardly a sufficient amount, surface 68 will then move into engagement with surface 39, to continue the camming or centering action until the kelly bushing is exactly centered relative to axis 14. In order to permit such accurate centering of the kelly bushing before pins 49 move into recesses 50, the parts are so related that, with ring 65 resting on ring 67, the ring 65 may be in its lowermost possible position within segments 24, before pins 49 have reached the level at which they can slip into recesses 50. That lowermost possible position of ring 65 is of course illustrated in Fig. 3, in which position the surface 68 has moved downwardly along surface 39 as far as it possibly can, to thereafter support ring 65 against any further downward movement. After ring 65 has reached the Fig. 3 position, but with that ring still in engagement with ring 67, the entire kelly bushing is very effectively centered at the location of ring 65 and also at the location of surface 40, to thus accurately align the kelly bushing with axis 14. The operator may then turn the kelly bushing about axis 14 to a position in which pins 49 are received directly over openings or recesses 50, and further lowering of the kelly bushing will then easily slip pins 49 into recesses 50. During such further downward movement, the kelly bushing body 44 and its associated parts including ring 67 move downwardly toward ring 65 to the Fig. 3 active position.

Pins 49 should of course be sufficiently loose within recesses 50 to allow easy insertion and removal of these pins. Also, the surfaces 40 and 63 should be a sufficiently loose fit to allow for insertion of projection 62 downwardly to its Fig. 3 position. Though it is undoubtedly obvious from the previous description, it should be perhaps mentioned that all of the annular surfaces 27, 28, 29, 30, 31, 32, 33, 34, 35, 36, 37, 39, 40, 41, 63, 68, 69 and 70 are centered about the main vertical axis 14 of the apparatus.

To now describe the use of the illustrated kelly bushing structure, assume that the master bushing parts 23 and 24 are positioned within rotary table 15—16, and that it is desired to insert the kelly bushing assembly 12 into its Fig. 3 position. To do this, an operator first elevates the kelly bushing assembly 12 to a position above the master bushing structure, and with the projection 62 of the kelly bushing extending downwardly. As the operator then lowers the kelly bushing toward the master bushing structure, it is of course a simple job to guide projection 60 into the relatively large opening formed within the upper portions of slip bowl segments 24, so that the surfaces 39 of the slip bowl segments can then gradually cam the lower end of projection 62 inwardly to a properly centered position as the kelly bushing is advanced further downwardly. When projection 62 reaches the Fig. 4 position, the lower end of the projection 62 is rather accurately centered relative to axis 14, but the upper portion of the kelly bushing may be off center, so that the bushing is disposed about an axis 72 extending at an angle to the main axis 14 of the rotary table. It will be apparent that without further automatic centering of the kelly bushing, it would be extremely difficult to properly direct pins 49 downwardly into the coacting recesses 50 in the master bushing structure. This difficulty has in fact been encountered almost invariably in the actual use of devices of the described pin drive type where no centering ring such as that shown in 65 is employed. However, when the ring 65 is provided, that ring moves into engagement with slip bowl segments 24 in the Fig. 4 position of the kelly bushing, so that as the kelly bushing is further lowered, the operator may manipulate the kelly bushing in a manner causing ring 65 to move downwardly with the kelly bushing and into segments 24, so that ring 65 and the kelly bushing are progressively cammed to a properly centered position by virtue of the engagement of cam surfaces 69 and 68 with segments 24. As previously mentioned, ring 65 reaches its Fig. 3 position of full support by segments 24, and therefore the fully centered position, before the lower ends of pins 49 reach recesses 50, so that the centering action is complete in sufficient time to assure properly aligned movement of pins 49 into those recesses. The relative movement provided for between ring 65 and projection 62 allows for this centering action prior to movement of the pins into their recesses, since the kelly bushing is able to move downwardly relative to ring 65 and to the Fig. 3 position after the centering action has been completed. When it is desired to remove the kelly bushing from the master bushing assembly, the kelly bushing may of course be easily withdrawn upwardly, and the entire kelly bushing assembly including ring 65 will be withdrawn out of engagement with the master bushing structure.

Figs. 7 and 8 show a variational form of the invention which is the same as that of Figs. 1 to 6 except in the respects specifically discussed below. The basic difference in this second form of the invention resides in the fact that it utilizes a square type of kelly drive connection instead of the pin type drive 49—50 of Figs. 1 to 6. A square drive of this general type has been shown in Patent No. 2,763,468, issued September 18, 1956 on Well Drilling Master Bushing Assemblies.

In Figs. 7 and 8, the outer one piece circularly continuous master bushing body 23a is externally essentially the same as in the first form, having an externally square upper portion 25a received within a square upper recess 19a of rotary section 16a of the rotary table, and having a lower externally circular portion 27a received within the lower circular portion 20a of the rotary table opening. Internally, the body 23a supports on its inclined frustro-conical surface 30a a pair of complementary semi-circular slip bowl segments 38a, having inner complementary frustro-conical surfaces which are engageable by centering ring 65a which is slidable vertically along depending tubular portion 62a of body 44a of the kelly bushing 12a. Ring 67a, rigidly attached to projection 62a, limits downward movement of ring 65a relative to the projection.

The slip bowl segments 38a terminate upwardly in horizontal top surfaces 42a which are spaced beneath the level of the horizontal top surfaces 43a and 22a of parts 23a and 16a. At their radially outer sides, the upper extremities of segments 38a have complementary cylindrical surfaces 36a engaging a corresponding cylindrical surface 32a of body 25a, with essentially horizontal shoulders on the segments 38a and body 25a being provided at 37a. Above the level of surfaces 42a, body 25a is shaped to form an upper square portion of the opening or recess which extends vertically through body 25a, which square portion receives and rotatively drives a correspondingly square portion 49a of kelly bushing body 44a. To form the square recess, the walls of the body opening extend outwardly beyond the diameter of surface 32a at four evenly circularly spaced locations, in a manner forming four corner recesses 50a into which the corners of square 49a project in driving relation. Between corner recesses 50a, the inner wall of body 25a may form four partial cylindrical upper continuations 132a of surface 32a, to pass segments 38a into and out of the body (since the diameter of surfaces 32a and 36a is preferably somewhat greater than the minimum width of square 49a). At its underside, square 49a may have been a horizontal surface 142a, engaging or spaced slightly above surfaces 42a, while above square 49a the kelly bushing body 44a may have a horizontally projecting flange 46a engaging surface 43a in a relation supporting the kelly bushing on master bushing body 25a.

In lowering the kelly bushing 12a to its illustrated operative position, the projection 62a first enters the master bushing parts 25a and 38a, and is guided by surfaces 39a toward a properly centered position. When projection 62a has reached the minimum diameter portion 40a of the passage through segments 38a, ring 65a (supported on ring 67a) enters the upper end of the opening in body 25a, and then enters segments 38a, to be cammed toward the ultimate fully centered position of Fig. 7. With the entire kelly bushing assembly thus centered, body 44a continues its downward movement to advance square portion 49a of body 44a into the square recess defined by corners 50a in body 25a.

It is noted that the ring 65a is free for sufficient vertical movement relative to projection 62a (between the position of Fig. 7 and the initial position in which ring 65a is supported by ring 67a) to assure full centering of the kelly bushing assembly before square 49a commences to move downwardly into essentially square recess 50a—132a. For this purpose, the vertical movement of ring 65a relative to projection 62a between the initial position of ring 65a on ring 67a and its Fig. 7 position, that is distance "X" in Fig. 7, should be greater than the vertical extent "Y" of the portion of square 49a which projects into the coacting square recess. Similarly, in the Figs. 1 to 6 form of the invention, the vertical distance "XX" should be at least as great as, and preferably greater than, the effective vertical length "YY" of pins 49.

I claim:

1. For use with a well drilling rotary table having a master bushing structure therein containing a vertically extending opening through which a kelly may extend; the combination comprising a kelly bushing adapted to transmit rotary motion of the table to said kelly and including drive means movable downwardly into interfitting engagement with coacting means associated with the rotary table and operable when thus engaged to transmit rotary motion of the rotary table to the kelly bushing, and means for centering said kelly bushing and said drive means relative to the master bushing structure during said downward movement of the drive means, said centering means including a projection carried by the kelly bushing and projecting downwardly and adapted to move downwardly into said master bushing structure and engage and be centered by it at a lower location therein, an upper centering element adapted upon downward movement to engage and be centered and supported by a portion of said master bushing structure at a second location spaced above said lower location, and means mounting said centering element to the kelly bushing for limited vertical movement relative to said drive means within a predetermined range of movement and between a lower relative position in which the element is carried during lowering of the kelly bushing and a second and higher relative position, said centering element in said lower relative position having a portion constructed and positioned to engage and be centered by the master bushing structure, and to thereby center said drive means, before said drive means have been moved downwardly far enough to interfit with said coacting means, said centering element being constructed and positioned to be supported by said master bushing structure against downward movement with said drive means during a final portion of the downward travel of the drive means, and said range of vertical movement of the centering element relative to said drive means being such as to then allow said final portion of the downward movement of said drive means into fully interfitting power transmitting engagement with said coacting means while said centering element is supported by the master bushing structure against further downward movement.

2. The combination as recited in claim 1, in which said projection is a downwardly extending tubular member adapted to extend about the kelly and having an outer surface essentially annularly engageable with said master bushing structure at said lower location, said means mounting the centering element for limited vertical movement relative to said drive means including an upper continuation of said tubular projection by which the latter is attached to the kelly bushing, said centering element being a ring mounted about said upper continuation for limited vertical movement relative thereto.

3. For use with a well drilling rotary table; the combination comprising a master bushing structure adapted to be supported and driven by said rotary table and containing a vertically extending opening through which a kelly may extend, a kelly bushing adapted to transmit rotary motion from said master bushing structure to said kelly and including drive means movable downwardly into interfitting engagement with coacting means carried by the master bushing structure and operable when thus engaged to transmit rotary motion from the master bushing structure to the kelly bushing, and means for centering said kelly bushing and said drive means relative to the master bushing structure during said downward movement of the drive means, said centering means including a projection carried by the kelly bushing and projecting downwardly and adapted to move downwardly into said master bushing structure and engage and be centered by it at a lower location therein, an upper centering element adapted upon downward movement to engage and be centered and supported by said master bushing structure at a second location spaced above said lower location, and means mounting said centering element to the kelly bushing for limited vertical movement relative to said drive means within a predetermined range of movement and between a lower relative position in which the element is carried during lowering of the kelly bushing and a second and higher relative position, said centering element in said lower relative position having a portion constructed and positioned to engage and be centered by the master bushing structure, and to thereby center said drive means, before said drive means have moved downwardly far enough to interfit with said coacting means, said centering element being constructed and positioned to be supported by said master bushing structure against downward movement with said drive means during a final portion of the downward travel of the drive means, and said range of vertical movement of the centering element relative to said drive means being such as to then allow said final portion of the downward movement of said drive means into fully interfitting power transmitting engagement with said coacting means while said centering element is supported by the master bushing structure against further downward movement.

4. The combination as recited in claim 3, in which said master bushing structure has an inner downwardly tapering surface adapted to engage said projection and said centering element and deflect them toward centered positions as they move downwardly, said projection being a vertical tubular element essentially annularly engageable in centering relation with said master bushing structure at the lower end of said tapering surface, said centering element being a ring vertically movable relative to said projection and adapted to engage and be supported by said tapering surface at a location spaced above said lower end thereof.

5. For use with a well drilling rotary table; the combination comprising a master bushing structure adapted to be supported and driven by said rotary table and containing a vertically extending opening through which a kelly may extend, a kelly bushing adapted to transmit rotary motion from said master bushing structure to said kelly and including drive means movable downwardly into interfitting engagement with coacting means carried by the master bushing structure and operable when thus engaged to transmit rotary motion from the master bushing structure to the kelly bushing, and means for centering said kelly bushing and said drive means relative to the master bushing structure during said downward movement of the drive means, said centering means including a projection carried by the kelly bushing and projecting downwardly and adapted to move downwardly into said master bushing structure and engage and be centered by it at a lower location therein, a second centering element adapted upon downward movement to engage and be centered and supported by said master bushing structure at a second location spaced above said lower location, and means mounting said second centering element for limited vertical movement relative to said drive means within a predetermined range of movement and between a lower relative position in which the element is carried during lowering of the kelly bushing and a second and higher relative position, said centering element in said lower relative position having a portion positioned to engage and be centered and supported by the master bushing structure before said drive means have moved downwardly far enough to interengage in rotary power transmitting relation with said coacting means, and said range of limited movement of said centering element relative to said drive means being great enough to then allow further downward movement of the drive means relative to said centering element and into fully interengaged rotary power transmitting relation with said coacting means while said centering element is supported by the master bushing structure against further downward movement, said master bushing structure having an inner downwardly tapering surface in said vertically extending opening adapted to engage said projection and said second centering element and deflect them toward centered positions as they move downwardly, and said second centering element being essentially a ring having a surface engageable with said surface of the master bushing structure and tapering essentially in correspondence therewith.

6. The combination as recited in claim 5, in which said ring has another surface located beneath, and tapering downwardly more rapidly than, said first surface of the ring.

7. For use with a well drilling rotary table; the combination comprising a master bushing structure adapted to be supported and driven by said rotary table and containing a vertically extending opening through which a kelly may extend, a kelly bushing adapted to transmit rotary motion from said master bushing structure to said kelly and including drive means movable downwardly into interfitting engagement with coacting means carried by the master bushing structure and operable when thus engaged to transmit rotary motion from the master bushing structure to the kelly bushing, and means for centering said kelly bushing and said drive means relative to the master bushing structure during said downward movement of the drive means, said centering means including a projection carried by the kelly bushing and projecting downwardly and adapted to move downwardly into said master bushing structure and engage and be centered by it at a lower location therein, a second centering element adapted upon downward movement to engage and be centered and supported by said master bushing structure at a second location spaced above said lower location, and means mounting said second centering element for limited vertical movement relative to said drive means within a predetermined range of movement and between a lower relative position in which the element is carried during lowering of the kelly bushing and a second and higher relative position, said centering element in said lower relative position having a portion positioned to engage and be centered and supported by the master bushing structure before said drive means have moved downwardly far enough to interengage in rotary power transmitting relation with said coacting means, and said range of limited movement of said centering element relative to said drive means being great enough to then allow further downward movement of the drive means relative to said centering element and into fully interengaged rotary power transmitting relation with said coacting means while said centering element is supported by the master bushing structure against further downward movement, said master bushing structure having an inner downwardly tapering surface in said vertically extending opening adapted to engage said projection and said centering element and deflect them toward centered positions as they move downwardly, said projection being a vertical tubular element essentially annularly engageable in centering relation with said master bushing structure at the lower end of said tapering surface, said second centering element being a ring vertically movable relative to said projection and adapted to engage and be supported by said tapering surface at a location spaced above said lower end thereof, said ring having a first surface tapering in correspondence with and engageable with said surface on the master bushing structure, and having another surface therebeneath tapering more rapidly, said drive means being a plurality of circularly spaced pins projecting downwardly from the kelly bushing and receivable within coacting sockets in said master bushing structure.

8. For use with a well drilling rotary table having a master bushing structure therein containing a vertically extending opening through which a kelly may extend; the combination comprising a kelly bushing adapted to transmit rotary motion of the table to said kelly and including drive means movable downwardly into interfitting engagement with coacting means associated with the rotary table and operable when thus engaged to transmit rotary motion of the rotary table to the kelly bushing, and means for centering said kelly bushing and said drive means relative to the master bushing structure during said downward movement of the drive means, said centering means including a centering element adapted upon downward movement to engage and be centered and supported by a portion of said master bushing structure, and means mounting said centering element to the kelly bushing for limited vertical movement relative to said drive means within a predetermined range of movement and between a lower relative position in which the element is carried during lowering of the kelly bushing and a second and higher relative position, said centering element in said lower relative position having a portion constructed and positioned to engage and be centered by the master bushing structure, and thereby center said drive means, before said drive means have moved downwardly far enough to interfit with said coacting means, said centering element being constructed and positioned to be supported by said master bushing structure against downward movement with said drive means during a final portion of the downward travel of the drive means, and said range of vertical movement of the centering element relative to said drive means being such as to then allow said final portion of the downward movement of said drive means into fully interfitting power transmitting engagement with said coacting means while said centering element is supported by the master bushing structure against further downward movement.

9. The combination as recited in claim 8, in which said centering element is position to be supported by the master bushing structure before said drive means first move into interfitting engagement with said coacting means, said range of vertical movement of said centering element relative to said drive means being at least as great as the vertical distance through which said drive means must move downwardly to reach full interengagement with said coacting means after the drive means and coacting means have first commenced to interfit.

10. The combination as recited in claim 8, in which said drive means include a plurality of drive pins projecting downwardly from said kelly bushing at locations spaced about the main axis of the kelly bushing and receivable within coacting sockets formed in the master bushing structure, the effective range of vertical movement of said centering element relative to said drive means being at least as great as the vertical distance through which said pins can move downwardly into said sockets after first entering the sockets.

11. The combination as recited in claim 8, in which said means mounting the centering element for limited vertical movement include a tubular projection extending downwardly at the lower end of the kelly bushing and adapted to extend about the kelly, said centering element being a ring mounted about said projection for limited vertical movement relative thereto.

12. The combination as recited in claim 8, in which said centering element has a downwardly tapering surface for engaging the master bushing structure in centering relation.

13. The combination as recited in claim 8, in which said centering element is essentially a ring which has a first downwardly tapering cam surface positioned to engage the master bushing structure and cam the ring toward a centered position relative thereto upon downward movement of the ring, said ring having a second downwardly tapering surface above said first surface but tapering more gradually than the first surface and positioned to engage a correspondingly tapered surface in said master bushing structure to support the ring in centered relation therein.

14. For use with a well drilling rotary table; the combination comprising a master bushing structure adapted to be supported and driven by said rotary table and containing a vertically extending opening through which a kelly may extend, a kelly bushing adapted to transmit rotary motion from said master bushing structure to said kelly and including drive means movable downwardly into interfitting engagement with coacting means carried by the master bushing structure and operable when thus engaged to transmit rotary motion from the master bushing structure to the kelly bushing, and means for centering said kelly bushing and said drive means relative to the master bushing structure during said downward movement of the drive means, said centering means including a centering element adapted upon downward movement to engage and be centered and supported by a portion of said master bushing structure, and means mounting said centering element to the kelly bushing for limited vertical movement relative to said drive means within a predetermined range of movement and between a lower relative position in which the element is carried during lowering of the kelly bushing and a second and higher relative position, said centering element in said lower relative position having a portion constructed and positioned to engage and be centered by the master bushing structure, and to thereby center said drive means, before said drive means have moved downwardly far enough to interfit with said coacting means, said centering element being constructed and positioned to be supported by said master bushing structure against downward movement with said drive means during a final portion of the downward travel of the drive means, and said range of vertical movement of the centering element relative to said drive means being such as to then allow said final portion of the downward movement of said drive means into full interfitting power transmitting engagement with said coacting means while said centering element is supported by the master bushing structure against further downward movement.

15. The combination as recited in claim 14, in which said master bushing structure has an inner downwardly tapering surface in said vertically extending opening adapted to engage said centering element and deflect it toward centered position as it moves downwardly.

16. The combination as recited in claim 15, in which said centering element is essentially a ring having a surface positioned to engage and be supported on said surface of the master bushing structure and tapering essentially in correspondence therewith.

17. The combination as recited in claim 16, in which said ring has another surface located beneath, and tapering downwardly more rapidly than, said first surface of the ring, and positioned to engage and be centered by the master bushing structure.

18. The combination as recited in claim 14, in which said centering element is positioned to be supported by the master bushing structure before said drive means first move into interfitting engagement with said coacting means, said range of vertical movement of said centering element relative to said drive means being at least as great as the vertical distance through which said drive means must move downwardly to reach full interengagement with said coacting means after the drive means and coacting means have first commenced to interfit.

19. The combination as recited in claim 14, in which said drive means include an upper essentially polygonal portion of said kelly bushing adapted to move downwardly into a coacting essentially polygonal drive recess in the master bushing structure, the effective range of vertical movement of said centering element relative to said drive means being at least as great as the vertical distance through which said polygonal portion of the kelly bushing can move downwardly into said polygonal recess after first entering it.

References Cited in the file of this patent

UNITED STATES PATENTS

| | | |
|---|---|---|
| 1,891,953 | Sellars | Dec. 27, 1932 |
| 2,205,269 | Morgan et al. | June 18, 1940 |
| 2,306,130 | Long | Dec. 22, 1942 |
| 2,306,647 | Smith | Dec. 29, 1942 |